United States Patent
Farahat et al.

(10) Patent No.: US 10,901,832 B2
(45) Date of Patent: Jan. 26, 2021

(54) SYSTEM FOR MAINTENANCE RECOMMENDATION BASED ON FAILURE PREDICTION

(71) Applicant: Hitachi, Ltd., Tokyo (JP)

(72) Inventors: Ahmed Khairy Farahat, Santa Clara, CA (US); Chetan Gupta, San Mateo, CA (US); Kosta Ristovski, San Jose, CA (US)

(73) Assignee: HITACHI, LTD., Tokyo (JP)

( * ) Notice: Subject to any disclaimer, the term of this patent is extended or adjusted under 35 U.S.C. 154(b) by 172 days.

(21) Appl. No.: 16/324,867

(22) PCT Filed: Jul. 26, 2017

(86) PCT No.: PCT/US2017/044033
§ 371 (c)(1),
(2) Date: Feb. 11, 2019

(87) PCT Pub. No.: WO2019/022737
PCT Pub. Date: Jan. 31, 2019

(65) Prior Publication Data
US 2020/0057689 A1    Feb. 20, 2020

(51) Int. Cl.
*G06F 11/00* (2006.01)
*G06F 11/07* (2006.01)
(Continued)

(52) U.S. Cl.
CPC ........ *G06F 11/079* (2013.01); *G06F 11/0709* (2013.01); *G06F 11/0751* (2013.01);
(Continued)

(58) Field of Classification Search
CPC ...... G06F 11/24; G06F 11/263; G06F 11/277; G06F 11/3058; G06F 11/3447; G06F 11/079; G06F 11/0779; G05B 2219/34477
See application file for complete search history.

(56) References Cited

U.S. PATENT DOCUMENTS

| 6,892,317 B1 | 5/2005 | Sampath et al. |
| 2008/0071501 A1 | 3/2008 | Herzog |

(Continued)

OTHER PUBLICATIONS

Google Scholar/Patents search, Sep. 24, 2020.*
International Search Report for related International Application No. PCT/JP2017/044033, dated Oct. 5, 2017; 2 pages.

*Primary Examiner* — Christopher S McCarthy
(74) *Attorney, Agent, or Firm* — Procopio, Cory, Hargreaves & Savitch LLP

(57) ABSTRACT

Example implementations described herein involve a system for maintenance recommendation based on data-driven failure prediction. The example implementations can involve estimating the probability of having a failure event in the near future given sensor measurements and events from the equipment, and then alerts the system user or maintenance staff if the probability of failure exceeds a certain threshold. The example implementations utilize historical failure cases along with the associated sensor measurements and events to learn a group of classification models that differentiate between failure and non-failure cases. In example implementations, the system then chooses the optimal model for failure prediction such that the overall cost of the maintenance process is minimized.

15 Claims, 16 Drawing Sheets

(51) Int. Cl.
*G06N 5/02* (2006.01)
*G06Q 30/02* (2012.01)

(52) U.S. Cl.
CPC ........... *G06F 11/0787* (2013.01); *G06N 5/02* (2013.01); *G06Q 30/0283* (2013.01)

(56) References Cited

U.S. PATENT DOCUMENTS

| | | | |
|---|---|---|---|
| 2008/0250265 A1* | 10/2008 | Chang | G06F 11/0709 714/4.12 |
| 2012/0191633 A1 | 7/2012 | Liu et al. | |
| 2015/0195192 A1 | 7/2015 | Vasseur et al. | |
| 2015/0227838 A1* | 8/2015 | Wang | G06N 20/00 706/12 |
| 2017/0286854 A1* | 10/2017 | Ardis | G06F 11/3447 |
| 2020/0210537 A1* | 7/2020 | Wang | G06F 30/20 |

* cited by examiner

| Time stamp | Sensor #1 | .... | Sensor #m |
|---|---|---|---|
| 2015/05/01 9:10:00 AM | 10 | .... | 700 |
| 2015/05/01 9:15:00 AM | 11 | .... | 710 |
| 2015/05/01 9:20:00 AM | 11 | .... | 712 |
| 2015/05/01 9:25:00 AM | 12 | .... | 710 |
| 2015/05/01 9:30:00 AM | 11 | .... | 710 |
| 2015/05/01 9:35:00 AM | 10 | .... | 710 |
| ... | ... | .... | ... |

FIG. 6(a)

|  | Actual Failure (+ve) | Actual Normal (-ve) |
|---|---|---|
| Predict Failure | True Positive (TP) | False Positive (FP) |
| Predict Normal | False Negative (FN) | True Negative (TN) |
|  | Total Number of Positive Instances (P=TP+FN) | Total Number of Negative Instances (N=FP+TN) |

FIG. 6(b)

| Model # | Recall (%) | False Alarm Rate (%) | Failure Cost ($) | Prediction Savings ($) | False Alarm Cost ($) | Total Savings ($) | Total Savings (%) |
|---|---|---|---|---|---|---|---|
| No Failure Prediction | ZERO | ZERO | ($300,000) | $0 | $0 | $0 | |
| 1 | 15.0±5.0 | 1.5±0.7 | ($300,000) | $45,000 | ($15,285) | $29,715 | 10% |
| 2 | 25.0±8.0 | 2.0±0.7 | ($300,000) | $75,000 | ($20,380) | $54,620 | 18% |
| 3 | 40.0±10.0 | 3.5±1.0 | ($300,000) | $120,000 | ($35,665) | $84,335 | 28% |
| 4 | 55.0±11.0 | 6.0±2.0 | ($300,000) | $165,000 | ($61,140) | $103,860 | 35% |
| 5 | 65.0±10.0 | 11.0±3.0 | ($300,000) | $195,000 | ($112,090) | $82,910 | 28% |
| 6 | 80.0±7.0 | 23.0±5.0 | ($300,000) | $240,000 | ($234,370) | $5,630 | 2% |
| Daily Inspection | ZERO | 100% | ($300,000) | $0 | ($1,019,000) | ($1,019,000) | |

FIG. 6(d)

SYSTEM FOR MAINTENANCE RECOMMENDATION BASED ON FAILURE PREDICTION

BACKGROUND

Field

The present disclosure is generally directed to system maintenance, and more specifically, to systems and methods for generating maintenance recommendations based on failure predictions.

Related Art

Maintenance is a process with an objective of keeping the equipment in a working, efficient and cost-effective condition. The maintenance process is conducted by performing the necessary actions on the equipment to achieve one or more of these objectives. Related art actions include the inspection, tuning, repair and overhaul of the equipment or its components. Equipment maintenance can be conducted in one of the following strategies:

(a) Corrective Maintenance: taking corrective actions after the equipment or one of its components fails to retain its working status. As this strategy waits for the equipment to fail before taking a maintenance action, corrective maintenance can result in decreasing the availability of the equipment. In addition, performing corrective actions after the occurrence of equipment failure may be more expensive and time-consuming.

(b) Preventive maintenance (also known as time-based maintenance): performing maintenance actions on a regular basis regardless of the condition of the equipment. In related art systems, preventive maintenance may be the most commonly followed strategy for equipment maintenance. Preventive maintenance avoids the limitations of corrective maintenance by performing periodic maintenance actions (e.g., periodic replacement of parts). However, preventive maintenance can be very expensive as most of the periodic maintenance actions are done while the equipment is in a good condition. Such maintenance could have been avoided if the actual condition of the equipment is known while planning for maintenance. Moreover, the equipment is still prone to unexpected failures that might happen due to abnormal usage patterns or environmental conditions between maintenance actions.

(c) Predictive Maintenance (also known as condition-based maintenance): continually monitoring the condition of the equipment to determine the maintenance actions need to be taken at certain times. Predictive maintenance can reduce the chance of unexpected failures, increase the equipment availability, and accordingly decrease the overall cost of the maintenance process.

In related art implementations, one of the main objectives of predictive maintenance is to prevent failures before they happen. Related art implementations attempt to prevent failures by monitoring the equipment and searching for any pre-failure patterns. Such related art monitoring processes are conducted manually through visual inspection of equipment, or through using monitoring tools such as vibration monitoring and other devices.

SUMMARY

With the advancement of operation and information technologies, most equipment are instrumented with a large number (e.g., hundreds) of sensors, and many measurements are produced frequently (e.g., every fraction of a second). These measurements contain valuable information about the status of the equipment and can be used to detect early signs of failures before they happen.

Example implementations described herein involve a system for maintenance recommendation based on data-driven failure prediction. The example implementations can involve estimating the probability of having a failure event in the near future given sensor measurements and events from the equipment, and then alerts the system user or maintenance staff if the probability of failure exceeds a certain threshold. The example implementations utilize historical failure cases along with the associated sensor measurements and events to learn a group of classification models that differentiate between failure and non-failure cases. In example implementations, the system then chooses the optimal model for failure prediction such that the overall cost of the maintenance process is minimized.

Aspects of the present disclosure can include a system configured to manage a plurality of apparatuses, each of the plurality of apparatuses configured to provide data feedback to the system. Such a system can include a memory configured to store a plurality of models configured to predict failure of one or more of the plurality of apparatuses from the data feedback; and a processor, configured to apply a first model of the plurality of models to the plurality of apparatuses for a first period of time. For a second period of time, based on the data feedback received for the first period of time, the processor is configured to evaluate the plurality of models based on a cost function associated with a false alarm rate, recall rate, and a cost associated with failure of the plurality of apparatuses; select a second model from the plurality of models from the evaluation based on the cost function, and apply the second model to the plurality of apparatuses for the second period of time.

Aspects of the present disclosure further include a method for managing a plurality of apparatuses, each of the plurality of apparatuses configured to provide data feedback to the system. The method can include managing a plurality of models configured to predict failure of one or more of the plurality of apparatuses from the data feedback; applying a first model of the plurality of models to the plurality of apparatuses for a first period of time; for a second period of time, based on the data feedback received for the first period of time, evaluating the plurality of models based on a cost function associated with a false alarm rate, recall rate, and a cost associated with failure of the plurality of apparatuses; selecting a second model from the plurality of models from the evaluation based on the cost function, and applying the second model to the plurality of apparatuses for the second period of time.

Aspects of the present disclosure further include a computer program for managing a plurality of apparatuses, each of the plurality of apparatuses configured to provide data feedback to the system. The computer program can include instructions for managing a plurality of models configured to predict failure of one or more of the plurality of apparatuses from the data feedback; applying a first model of the plurality of models to the plurality of apparatuses for a first period of time; for a second period of time, based on the data feedback received for the first period of time, evaluating the plurality of models based on a cost function associated with a false alarm rate, recall rate, and a cost associated with failure of the plurality of apparatuses; selecting a second model from the plurality of models from the evaluation based on the cost function, and applying the second model to the plurality of apparatuses for the second period of time. The computer program may be stored in a non-transitory computer readable medium, wherein the instructions can be executed by one or more processors.

Aspects of the present disclosure further include a system for managing a plurality of apparatuses, each of the plurality of apparatuses configured to provide data feedback to the system. The system can include means for managing a plurality of models configured to predict failure of one or more of the plurality of apparatuses from the data feedback; means for applying a first model of the plurality of models to the plurality of apparatuses for a first period of time; for a second period of time, based on the data feedback received for the first period of time, means for evaluating the plurality of models based on a cost function associated with a false alarm rate, recall rate, and a cost associated with failure of the plurality of apparatuses; means for selecting a second model from the plurality of models from the evaluation based on the cost function, and means for applying the second model to the plurality of apparatuses for the second period of time.

BRIEF DESCRIPTION OF DRAWINGS

FIG. 6(a) illustrates a sample output of the data cleaning process, in accordance with an example implementation.

FIG. 6(b) illustrates an example confusion matrix used to calculate classifier performance measures, in accordance with an example implementation.

FIG. 6(d) illustrates an example of cost calculations for the cost aware model selection, in accordance with an example implementation.

DETAILED DESCRIPTION

Figure 1A:
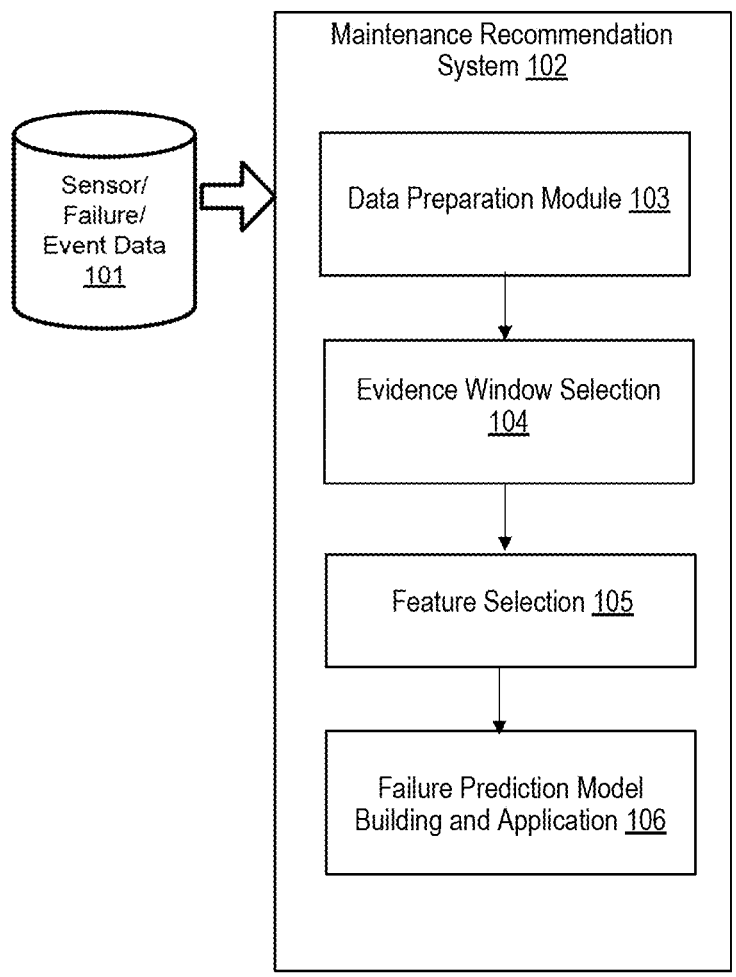
FIG. 1(a) illustrates an example system for maintenance recommendation based on failure prediction, in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations described herein are directed to a system for maintenance recommendation through the prediction of failures. The example implementations can be utilized by, but is not limited to, equipment end-users and/or operators, maintenance personnel and management, decision makers, and operation managers.

The functions provided to the aforementioned users can include, but is not limited to, determining whether a failure is about to happen, preventing catastrophic failures from happening to avoid failure and repair costs accordingly, and reducing the overall maintenance cost.

The example implementations described herein can be used as a standalone solution or be integrated with existing systems that provide other functionalities for maintenance management and optimization.

The example implementations can involve the following formats of input data:

(a) Sensor Data: Sensor data can involve streaming and historical time series data collected from different sensors measuring desired metrics of components or other aspects of an apparatus. Each time series represent the readings of the sensor value for every k period of time, where k can depend on the frequency by which data can be retrieved from a given sensor. The sampling rate k can have different values for different sensors. Each sensor reading is associated with a timestamp that specifies the date and time of the reading. The data can also be collected from the sensor in batches, where each batch of data represents the sensor readings for a few days. Other time periods are possible depending on the desired implementation (e.g. a few hours). There might be gaps between batches. The gaps can be due to data being received late at the monitoring facilities, or data discarded by the equipment and not received at all. For instance, an example implementation to reduce communication may send data for two day batches every five days and discard the rest. The data collection frequency can also differ from one sensor to another.

(b) Event data: Event data involves sequences of non-failure events that can involve different types of events, such as maintenance actions, alarms, and so on. Each of the events can be associated with a timestamp that specifies the date and time of the event occurrence. Event data collection can be conducted in real-time as they are reported to the operators, or through other methods depending on the desired implementation. The event data can be used in the model building phase to (1) extract event-based features and (2) filter out periods of data where the equipment was subject to abnormal conditions.

(c) Failure data: Failure data involves discrete failure events that happened in the past. Each failure event is associated with a time-stamp that specifies the date and sometimes the time of the failure. The failure event might also have associated attributes like the type of the failure, the particular component that failed, other attributes related to the cause of the failure, the repair actions, and other attributes according to the desired implementation.

(d) Metadata: Metadata describes extra information about the characteristics of the equipment and environment in which the equipment is installed. This includes, but is not limited to, the specifications of the equipment (e.g., model, make, capacity), operation conditions (e.g., operation hours), environment conditions (e.g., location, temperature, humidity), the installation information (e.g., date), and maintenance records (e.g., date, conditions, notes). All metadata can appear in structured, semi-structured or unstructured formats.

FIG. 1(a) illustrates an example system for maintenance recommendation based on failure prediction, in accordance with an example implementation. The maintenance recommendation system 102 can intake raw sensor, event and failure data 101 for processing by the following modules. Data preparation 103 is configured to prepare the raw sensor and event data 101 by removing noise and identifying the subset of data that are useful for further analysis. Further details of data preparation 103 are provided with respect to FIG. 2(a).

Evidence window extraction 104 is responsible for extracting windows of sensor measurements and events from historical data which correspond to failure and normal cases. The extracted windows are then used for training the failure prediction model. Evidence window extraction 104 is also responsible for extracting windows of sensor measurements and events from streaming data. The extracted windows will be inspected by the failure prediction model for any signs of failures. Further details of evidence window extraction 104 are provided with respect to FIG. 5(a).

Feature extraction 105 extracts features from each window of measurements. The extracted features are then provided to the failure prediction model for training/application. Further details of feature extraction 105 are provided below.

Failure prediction model building and application 106 is responsible for building the models used failure prediction and maintaining these models for application on new data. Further details of failure prediction model building and application 106 are provided with respect to FIG. 7.

Figure 1B:
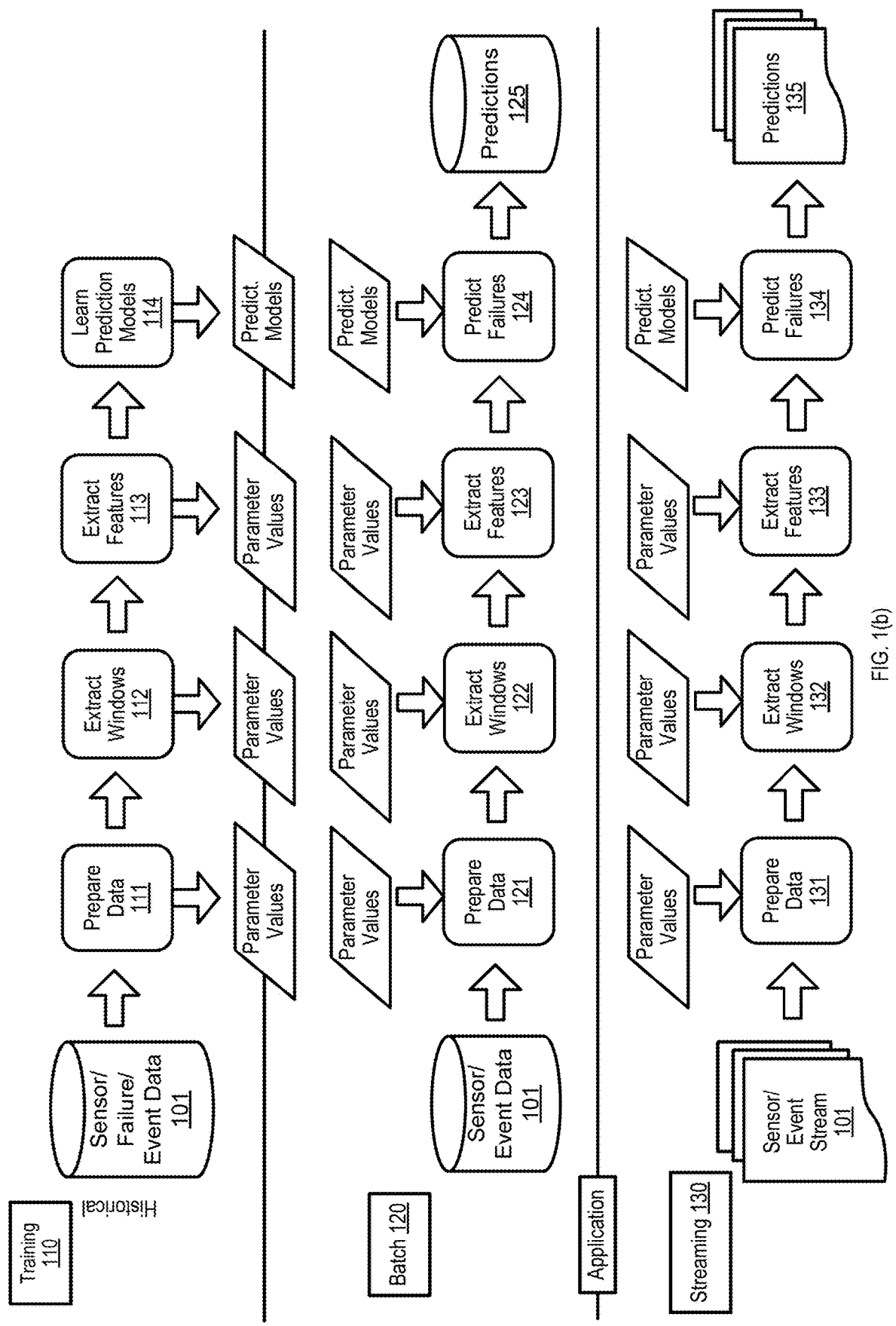
FIG. 1(b) illustrates example data pipelines, in accordance with an example implementation.
Figure 5A:
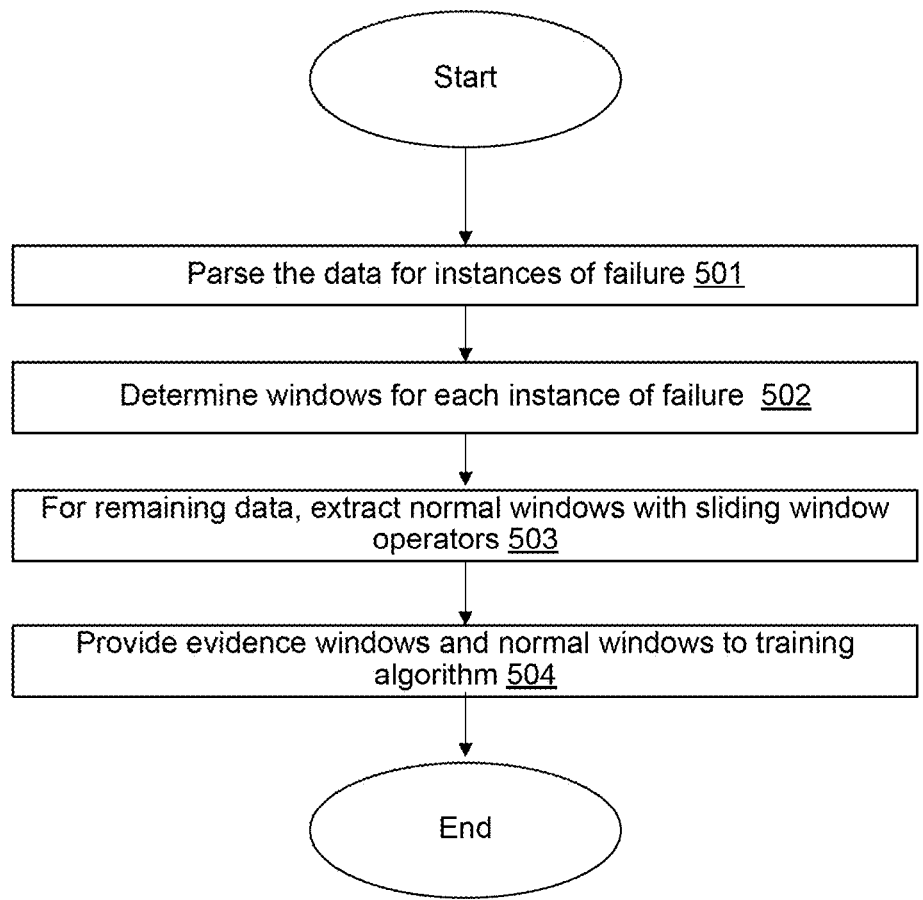
FIG. 5(a) illustrates a flow diagram for evidence window extraction, in accordance with an example implementation.
Figure 5B:
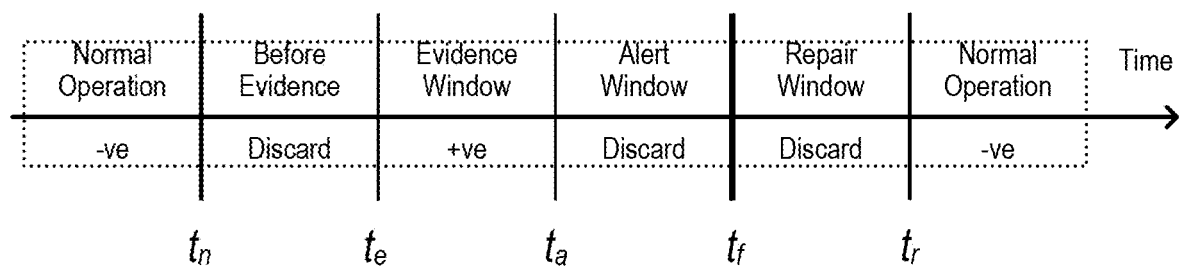
FIG. 5(b) illustrates the window extraction process from failure instances, in accordance with an example implementation.

FIG. 1(b) illustrates example data pipelines, in accordance with an example implementation. Specifically, FIG. 1(b) illustrates an example data flow diagram in accordance with an example implementation. The first pipeline represents the model training 110, while the second and third pipelines represent the model application for both batch 120 and steaming cases 130. Model training 110 will execute a process similar to that illustrated in FIG. 2(a) to perform a preparation of data 111 and generate parameter values that is utilized in the data preparation 121 of batch processing 120 and data preparation 131 of stream processing 130. The prepared data are provided to extract windows 112, the process of which is illustrated in FIGS. 5(a) and 5(b), which provides parameter values that can be used for the window extraction 122 for batch processing 120, and window extraction 132 for stream processing 130. The prepared data along with the data structure indicative of the extracted windows are then provided to feature extraction 113, the process of which is described below. The parameter values indicative of the extracted features can also be provided to feature extraction 123 for batch processing 120, and feature extraction 133 of stream processing 130. The data structures provided from feature extraction 113 is provided to learn prediction models 114 through the use of classifiers. Such models can be utilized to predict failure 124 for batch processing 120 and predict failure 134 for stream processing 130.

Figure 2A:
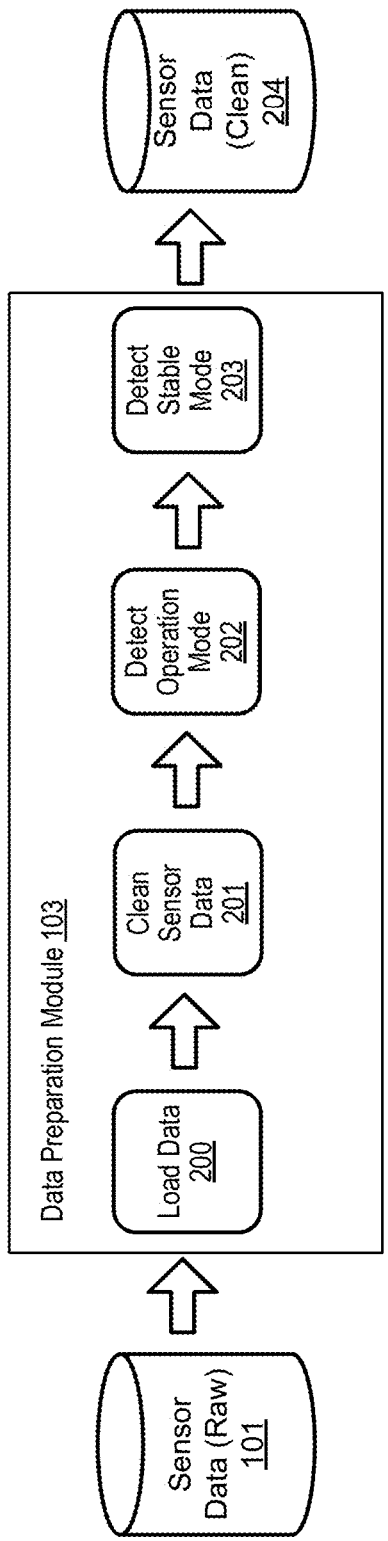
FIG. 2(a) illustrates a data preparation module, in accordance with an example implementation.

FIG. 2(a) illustrates a data preparation module, in accordance with an example implementation. The data preparation module 103 is configured to receive as input historical/new sensor data 101 along with metadata about the equipment, and can include the following processes. A loading function 200 can be configured as a buffer to load in the sensor data 101. Data cleaning 201 is a process configured to consolidate data from different streams and remove noise and outliers from the data. Operation mode detector 202 is a process configured to detect the operation mode of the equipment from the sensor data. Stable mode detector 203 is a process configured to detect parts of the time series that correspond to a state where the condition of the equipment is stable (i.e., does not experience changes beyond a desired threshold in sensor readings). Information regarding the operation mode 202 and the stable mode 203 is output by the data cleaning 201 along with the sensor data 204. In other words, the sensor data 101 can be augmented with information about the operation and stable mode to produce sensor data 204.

Figure 2B:
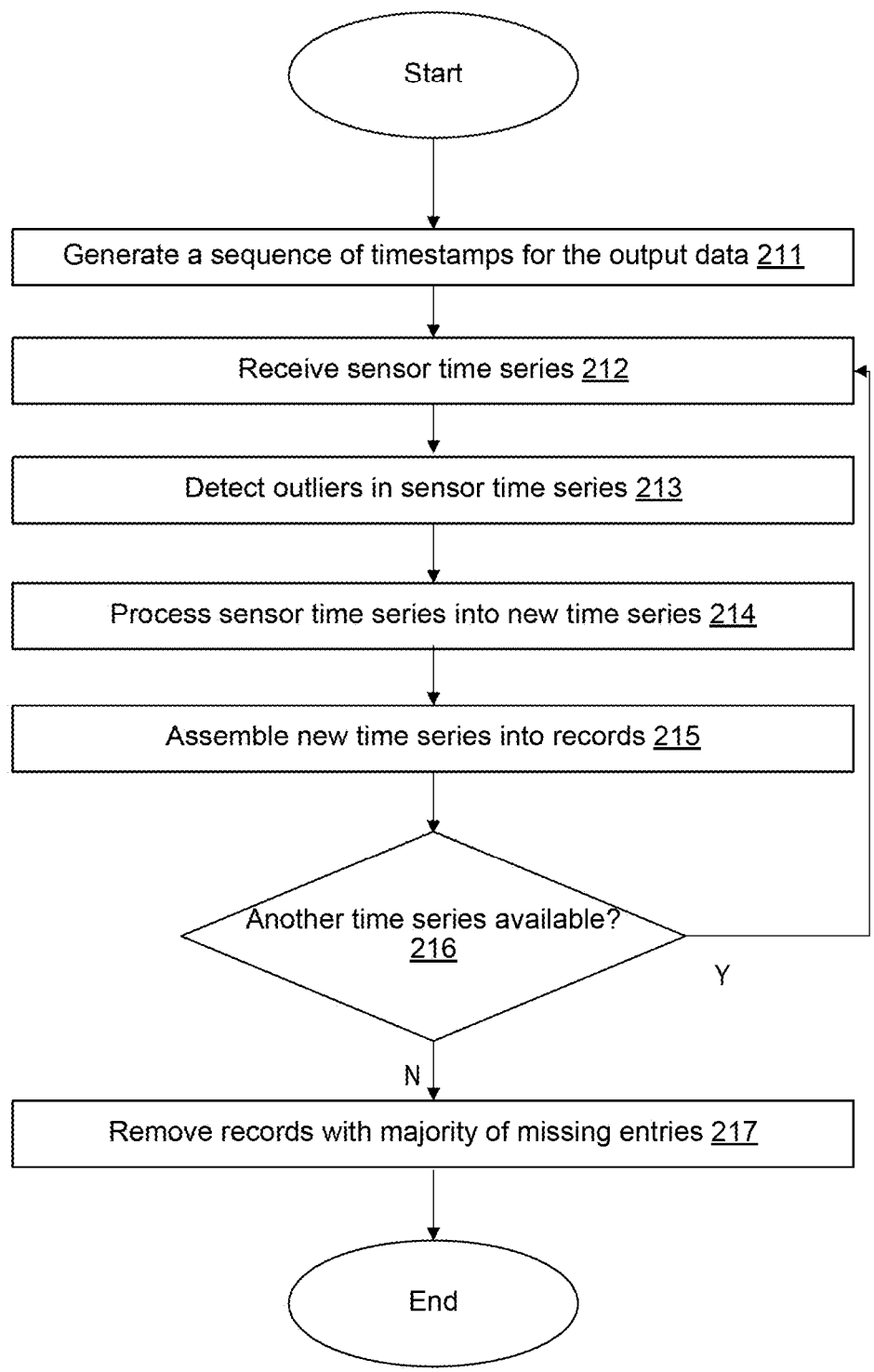
FIG. 2(b) illustrates a flow diagram for the data cleaning process 201, in accordance with an example implementation.

FIG. 2(b) illustrates a flow diagram for the data cleaning process 201, in accordance with an example implementation. Sensor data can be collected from different data streams (e.g., equipment sensors and weather data). Each time series might have a different sampling rate and the data might arrive in batches of different sizes. The data cleaning process 201 is configured to consolidate data from different sources and obtain data in a format that relates sensors to sensor readings and timestamps. An example format can include a tabular format with columns that represent the sensors and each row represents the sensor readings at a unique timestamp, but is not limited thereto. In such an example, the rows are referred to as data records. The data cleaning process can then proceed in accordance with the flow diagram.

At 211, the data cleaning process 201 is configured to generate a common sequence of timestamps for the output data. The common sequence can be generated based on a fixed gap (e.g., every 5 minutes) or using the timestamps of one of the sensors (e.g., the one with the largest number of readings), depending on the desired implementation.

At 212, the data cleaning process 201 receives a sensor time series. At 213, the data cleaning submodule 201 detects outliers in the sensor reading. When an outlier is detected, the data cleaning process 201 can either remove the outlier or replace the outlier with values calculated based on other readings of the same sensor (e.g., average or median of nearest neighbors).

At 214, the data cleaning process 201 conducts processing for a given sensor time series. The processing of the sensor time series may also include the estimation of the sensor values at each common timestamp by interpolating the readings of the sensor time series at nearby timestamps. The estimation can be conducted by learning a regression model for the original time series and finding the values of regression function at the common timestamps, or by other methods depending on the desired implementations.

At 215, the data cleaning process 201 assembles the new sensor time series into records. At 216, the data cleaning process 201 performs a check to determine if there is another sensor time series for processing. If so (Yes), then the flow proceeds back to 212, otherwise (No), the flow proceeds to 217 wherein the flow removes records having a majority of missing entries, and the sensor data is provided. FIG. 6(a) illustrates a sample output of the data cleaning process.

Figure 2C:
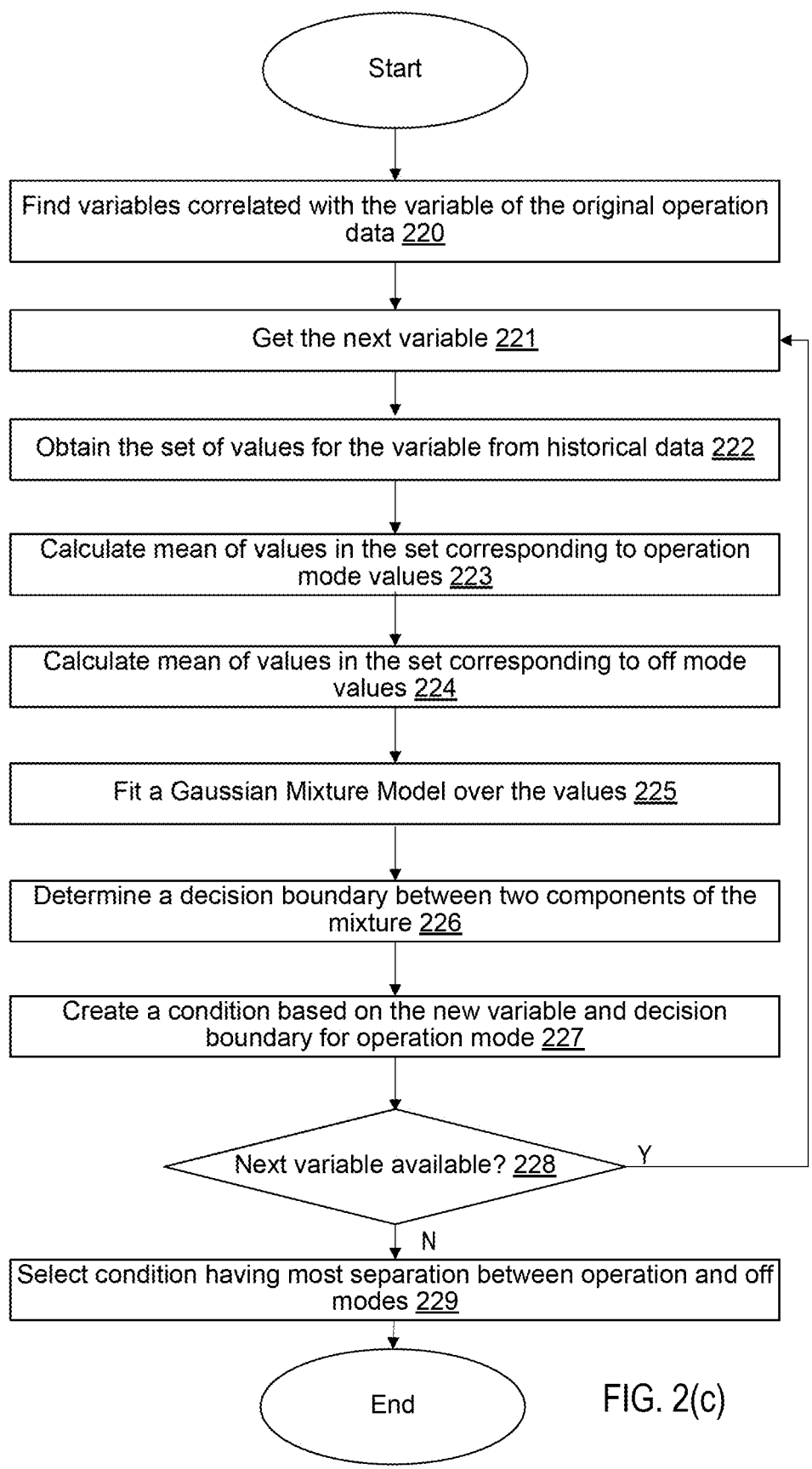
FIG. 2(c) illustrates an example flow diagram for the operation mode detector process, in accordance with an example implementation.

FIG. 2(c) illustrates an example flow diagram for the operation mode detector process 202, in accordance with an example implementation. The operation mode detector process 202 is configured to identify the periods during which the equipment is being operated. These periods are referred to as the "operation" mode. The periods during which the equipment is not being operated are referred to as the "off" mode. Information about the operation mode is represented in the metadata as conditions over sensor data (e.g., current>100 and temperature>40). These conditions are typically defined by the domain experts from the specifications given by the equipment manufacturer, and most of the time they do not accurately reflect the actual operation conditions of the equipment. In addition, the sensors included in these conditions might be noisy. This results in misidentifying periods during which the equipment is being operated. In order to avoid these limitations, example implementations utilize historical data to learn more accurate conditions for the operation mode.

Figure 3:
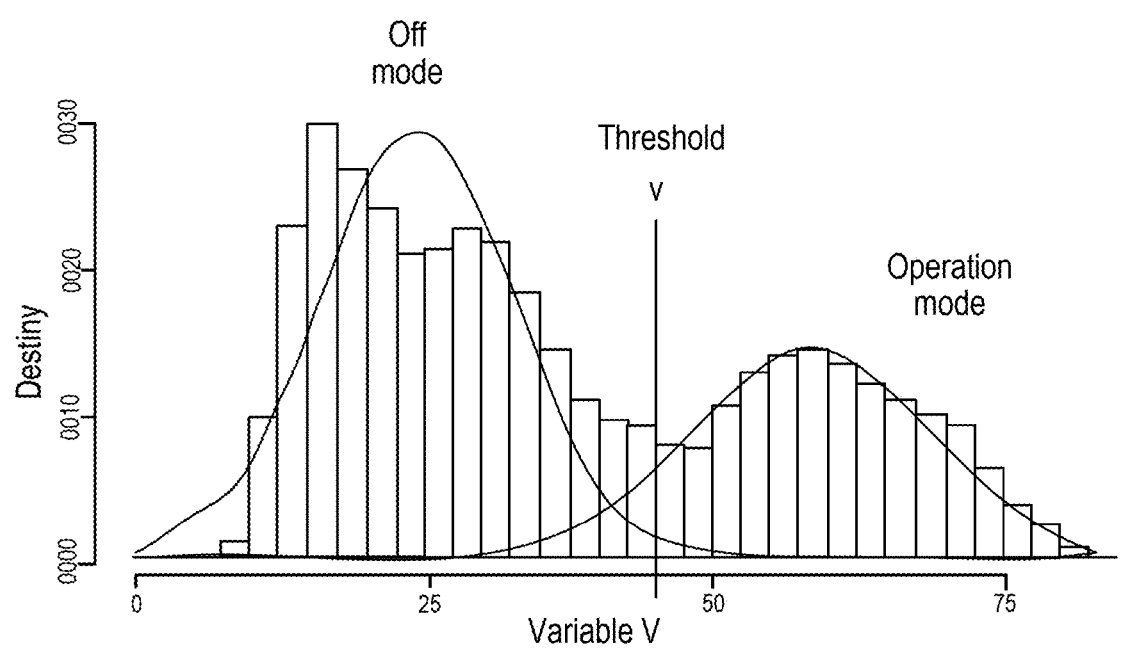
FIG. 3 shows an example of a GMM learned over historical sensor data of a variable correlated with the original variable specified in the metadata, through the flow diagram of FIG. 2(c).

Let "A≥a" be a condition defined by the domain expert for the operation mode, where "A" is a variable that corresponds to some sensor and "a" is a threshold value (A condition in the form of A≤a can be transformed to A'≥a' without loss of generality). The operation mode detector proceeds as follow:

At 220, the operation mode detector process 202 find variables "$\{B_1, \ldots B_r\}$" that have strong correlation with "A". Correlation can be defined by the domain expert based on the physical model of the equipment or learned using data-driven measures, or through other methods in accordance with the desired implementation. At 221, the operation mode detector process 202 processes each variable $V \in \{A, B_1 \ldots B_r\}$ from the original variable and variables identified at 220. At 222, the operation mode detector process 202 obtains the values of "V" from historical data. At 223, the operation mode detector process 202 calculates $m_1$ as the mean of the values of "V" that correspond to "A≥a" (operation mode values). At 224, the operation mode detector process 202 calculates $m_2$ as the mean of the values of "V" that correspond to "A<a" (off mode values). At 225, the operation mode detector process 202 fits a Gaussian Mixture Model (GMM) with two components over the values of "V", by using an iterative algorithm such as Expectation Maximization (EM) with initial means for the two mixtures equal to $m_1$ and $m_2$, or by other methods in accordance with the desired implementation. At 226, the operation mode detector process 202 determines a decision boundary "v" between the two mixtures for which p(v∈ "operation")>>p(v∈"off"). At 227, the operation mode detector process 202 creates a new condition "V><=v" for "operation" mode (V≥v if $m_1$>$m_2$ or V≤v if $m_1$<$m_2$). At 228, if there are variables remaining for processing (Yes) then the flow reverts to 221 to process the next variable, otherwise (No) the flow proceeds to 229. At 229, the operation mode detector process 202 selects the condition "V><=v" which has the most separation between "operation" and "off" components. FIG. 3 shows an example of a GMM learned over historical sensor data of a variable correlated with the original variable specified in the metadata, through the flow diagram of FIG. 2(c).

Figure 2D:
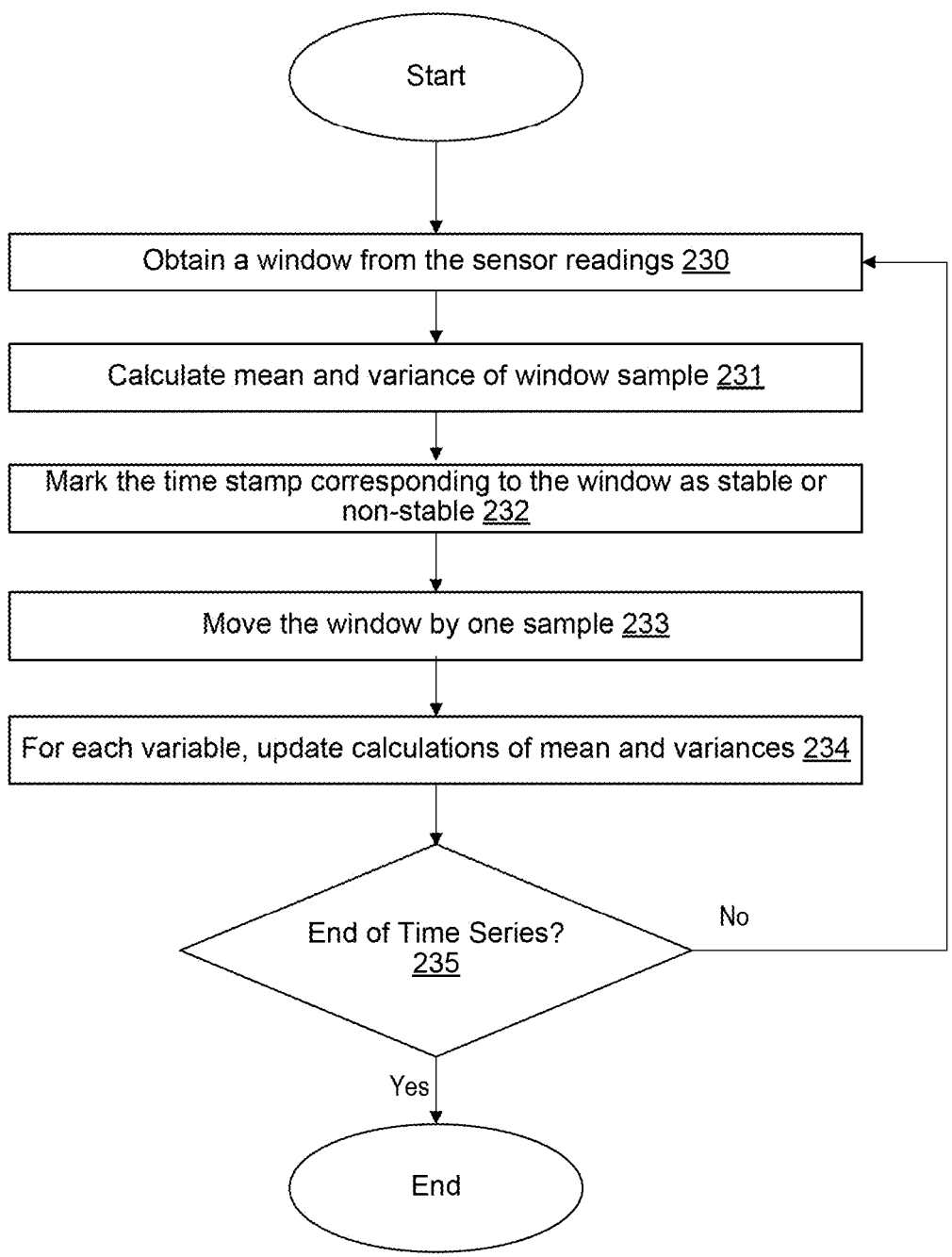
FIG. 2(d) illustrates a flow diagram for the stable mode detector process, in accordance with an example implementation.

FIG. 2(d) illustrates a flow diagram for a stable mode detector process 203, in accordance with an example implementation. When the equipment status changes from one mode to another (e.g., "off" to "operation" or vice versa), the raw signals from the sensors may experience high fluctuations shortly after the change. During these fluctuations, it may be difficult to obtain information about the relations between different signals. For instance, if the readings of sensor "A" reflect the changes in the readings of sensor "B", there may be a delay between the time at which sensor "A" and that at which "B" changes, and the data right after the transition of "B" should not be used to judge on the relation between the two signals. To avoid this problem, example implementations utilize a moving window to filter-out periods of the time series that experience large variances in the signals of interest. Given a set of sensor variables $V_1, \ldots V_m$ and the corresponding thresholds on the variances of these variables $O'_1, \ldots O'_m$, the algorithm for stable mode detector submodule 203 executes the following flow diagram.

At 230, the stable mode detector process 203 starts at the entry corresponding to the first timestamp, and obtains the sensor readings in a window of size "w" samples. At 231, for each variable "$V_i$", the stable mode detector process 203 calculates the mean and variance of the samples for this variable $\{v_i^{(t)}, v_i^{(t-1)}, \ldots, v_i^{(t-w)}\}$. At 232, the stable mode detector process 203 marks the timestamp at the end of the window as stable if variance $(v_i^{(t)}, v_i^{(t-1)}, \ldots v_i^{(t-w)}) \leq O'_i$, for all variables. At 233, the stable mode detector process 203 moves the window by one sample (e.g. remove the first sample and add the "w+1"-th sample). At 234, for each variable "V", the stable mode detector process 203 updates the calculations of the mean and variances using recursive formulas. At 235, the stable mode detector process 203 checks if the end of the time series is reached. If so (Yes), then the flow ends. If not (No), then the flow proceeds back to 230.

Figure 4:
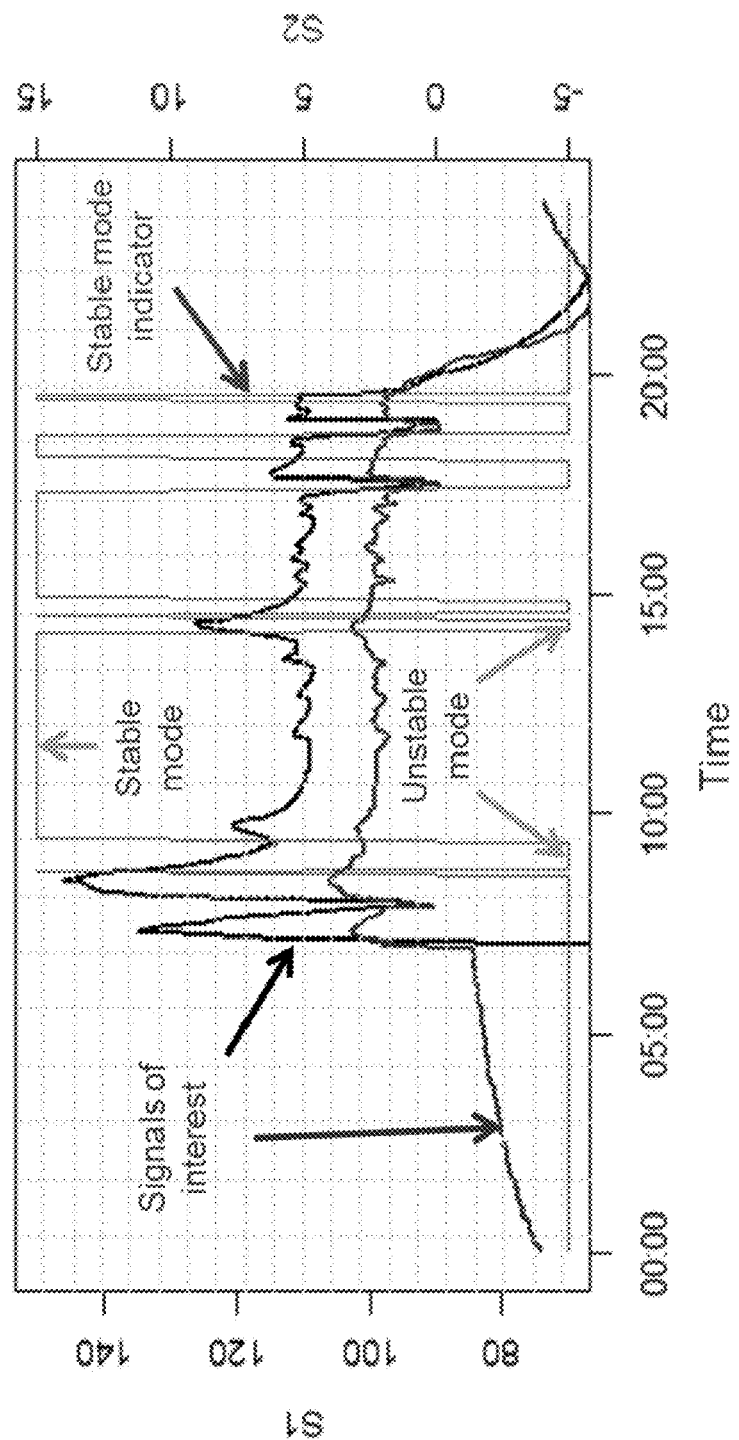
FIG. 4 illustrates an example application of the stable mode detector for multiple signals, in accordance with an example implementation.

The thresholds can be tuned using a few examples from stable and non-stable modes, or by other methods in accordance with the desired implementation. FIG. 4 illustrates an example of how the stable mode detector is applied to multiple signals, through the flow diagram of FIG. 2(d).

FIG. 5(a) illustrates a flow diagram for evidence window extraction 104, in accordance with an example implementation. After the data is processed, the next procedure in failure prediction is to extract windows of data which are believed to contain pre-failure patterns. After that, features are extracted from these windows, and these features are applied to the failure prediction module for training/application. The flow starts at 501, wherein the processed data 204 from FIG. 2(d) is provided to the evidence window extraction flow. The flow can also process historical data in the same manner.

At 502, windows are determined for each instance of failure. In the training phase, the window extraction process proceeds as follows. For each past failure instance, windows of observations are extracted. The windows can include the Alert Window ($[t_a, t_f]$, $t_a=t-W_a$), which is the period of time just before the failure during which countermeasures are required to prevent the failure from happening. Eventually, such windows may be discarded and not included in the training data of the failure prediction model.

The windows can further include the Evidence Window ($[t_e, t_a]$, $t_e=t_a-W_e$) which is the period of time before the alert window during which the pre-failure patterns happen. The evidence time windows are considered as the positive class for the failure prediction model.

The windows can also include the Before Evidence Window ($[t_n, t_e]$), which is a transition period between the normal operation and the evidence window. Such time windows can be discarded after identification to exclude them from the training data of the failure prediction model.

The windows can also include the Repair Window ($[t_f, t_r]$), which is the time taken after the failure in order to restore the equipment or component to normal operation. The observations within this window may also be discarded for training purposes as well.

The windows can also include the Normal Operation Windows ($[t > t_r$ or $t > t_r]$), which include observations after the repair and before the signs of failure appear. Normal data can be extracted from these windows by using a sliding window operator. These time windows (along with other windows from normal instances) can be considered as the negative class for the failure prediction model.

The time stamps used to generate the aforementioned windows are as follows. $t_f$ is the time when the failure happened, $t_r$ is the time when the repair was completed, $t_e$ is the earliest time before failure for when the evidence for failure can be detected. $t_a$ is the latest time before failure at which the maintenance staff need to receive an alert about the failure in order to apply the appropriate countermeasure before the actual failure happens. $t_n$ is the latest time before failure when it was believed that the equipment is acting normally.

The failure time $t_f$ can be provided in the historical log of events. Other times are determined automatically given the failure time and the window size parameters that can be entered manually by domain experts or tuned based on the performance of the algorithm as well as the cost savings associated with its deployment. FIG. 5(b) illustrates the window extraction process from failure instances, which indicates the different types of windows extracted for a given failure time. At 503, for period of times when no failure happened, normal windows are extracted by using sliding window operators. In comparison to normal operation, occurrences of failure are rarer. The observations available for normal operation are larger than those available for failure instances. This result in an imbalance between the normal (−ve) and failure (+ve) classes. To resolve this situation, normal windows are down-sampled.

After extracting different windows, the evidence and normal windows are provided for the model training algorithm, while other windows are discarded at 504.

In the model application phase (batch or streaming), a sliding window operator can be applied to all signals to extract the time windows to which the failure prediction model will be applied.

For feature extraction as processed by feature extraction 105, given a set of sensor measurements and events over time $S = \{s_1(t), s_2(t), \ldots s_k(t)\}$, and a time window $[t_1, t_2]$, all the measurements within this time window are extracted, and then a group of features are extracted to be provided to the failure prediction model. Such features include—but are not limited to:

Window-level statistics: For each sensor $s_i$ or event type $e_j$, calculate a statistic over all the sensor measurements or event occurrences within this window (e.g., minimum, maximum, average, median of events, frequency of events, and so on).

Trends: For each sensor $s_i$ or event type $e_j$, quantify the trend of sensor measurements or event occurrences within the window (e.g., increasing, decreasing, constant, slope of increase/decrease, and so on).

Correlations: Detect and quantify correlations between multiple sensor measurements: $s_1, s_2, \ldots s_k$ or multiple event types $e_1, e_2, \ldots e_k$ or between sensors and event types (e.g., correlation coefficients).

The set of features are then transformed to a single vector for each window. For training data, the features of all normal and evidence windows are combined into an n×m feature matrix X where the (i,j)-th element represent the value of feature j for window i, n is the number of features and m is the number of windows. In the model application phase, the features of new window are represented as a vector when is then applied to the failure prediction model.

To predict failures, a classifier is trained to differentiate between the feature vectors of windows corresponding to failure instances and those corresponding to normal instances. Classification models such as random forest, support vector machines, or deep networks, or others can be used according to the desired implementation. In the training phase, since the failure instances is small compared to the normal instances, a few normal instances are first selected, and the classification model is then trained by using all failure instances and the selected normal instances. Normal instances can be sampled using a variety of methods including but not limited to, uniform and non-uniform random sampling, deterministic selection using clustering, and deterministic selection using matrix factorization techniques to down-sample the normal instances.

There are multiple parameters of the model that need to be selected during the training of the model. Some of these parameters might affect the accuracy of the model on normal and failure cases and accordingly affect the cost savings introduced by the model deployment. These parameters include, but are not limited to the following. Window extraction parameters include the size of the evidence and alert windows. Model building and application parameters include the ratio of normal to failure instances in the training set, and the probability threshold used to issue alerts. Such parameters can be tuned to maximize the model performance during deployment and the cost savings achieved by the model.

In the case of having multiple failure types (also known as failure modes), a binary classifier can be learned for each failure type that differentiate between instances of this failure type and normal instances.

After the model is trained using the historical failure instances, sensor measurements and events, the model is deployed to work on real-time sensor measurements and events obtained from the equipment. The performance of the model during the deployment time can be estimated using training samples k-fold cross-validation. In k-fold cross-validation, the training data is split into k folds. The failure prediction model is then trained on (k−1) folds and tested on the remaining k-th fold. This process is repeated k times for the k folds and the resulting prediction labels are compared to the ground-truth labels (e.g., failure or normal) to estimate the performance of the model.

For each classification algorithm, there is a trade-off between the recall and the false alarm rate. If the recall is high, the algorithm tends to generate more false alarms. On the other hand, if the false alarm is very low, the algorithm will miss more failure cases (i.e., lower recall.) This trade-off can be controlled by changing some the aforementioned model parameters. For instance, increasing the size of ratio of normal to failure samples will decrease the false alarm, but decrease the recall as well, while decreasing this ratio will increase both the recall and false alarm.

FIG. 6(a) illustrates a sample output of the data cleaning process. Specifically, FIG. 6(a) illustrates example sensor data after data cleaning is completed. At each timestamp, sensor values from sensor #1 to sensor #m are recorded.

FIG. 6(b) illustrates an example confusion matrix used to calculate classifier performance measures, in accordance with an example implementation. Several measures can be used to estimate the performance of the model. To calculate these measures, a confusion matrix is first constructed by counting the number of actual failures that are correctly and wrongfully classified as failures (namely true positive (TP) and false negative (FN), respectively) and the number of actual normal cases that are correctly and wrongfully classified as normal (namely true negative (TN) and false positive (FP), respectively). FIG. 6(b) illustrates an example as to how such confusion matrix can be constructed.

Several performance measures can be derived from the confusion matrix; this includes but is not limited to:

Recall or True Positive Rate=TP/P=TP/(TP+FN): This is the percentage of actual failures correctly predicted by the model.

False Alarm Rate=FP/N=FP/(FP+TN): This is the percentage of actual normal cases wrongfully classified by the model as failures.

Precision=TP/(TP+FP): This is the percentage of predicted failure cases correctly classified as failures.

In example implementations, a combination of (recall and precision) or (recall and false alarm rate) can be used to describe the performance of a classification algorithm on both failure and normal cases.

Figure 6C:
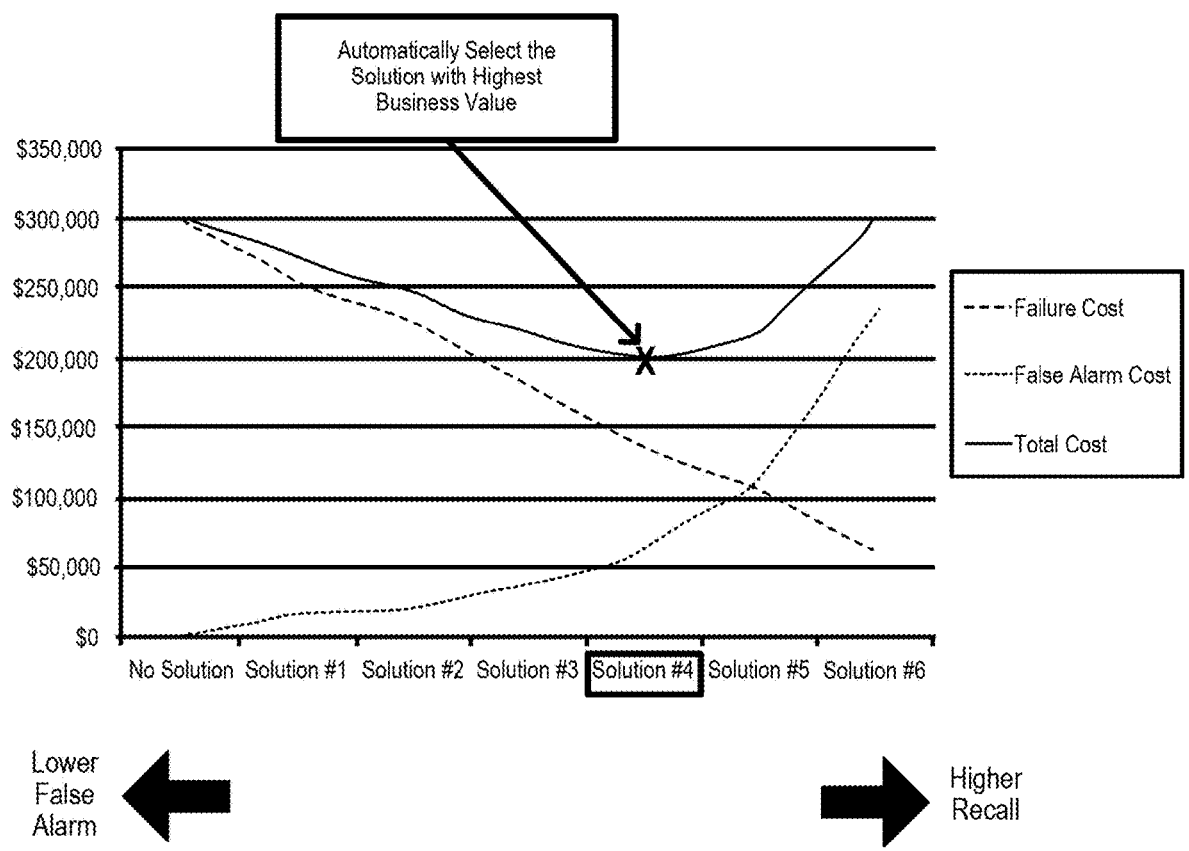
FIG. 6(c) illustrates an example cost-aware model selection, in accordance with an example implementation.

FIG. 6(c) illustrates an example cost-aware model selection, in accordance with an example implementation. In example implementations, a model is chosen which achieves the maximum cost savings. However, the costs associated with failures and the different maintenance actions vary with time, and hence there is a need to update cost calculations on a periodic basis. These costs depend on several factors at the time of application of the model, which can include, but is not limited to, cost of inspection, cost of repair, cost of downtime and loss of operation, cost of parts, and so on. Given the aforementioned performance measures, the cost savings introduced by a failure prediction model during deployment can be estimated as Cost Savings=f (Failure Rate, Recall, False Alarm Rate, Cost of Inspection, Cost of Downtime, Cost of Repair, Cost of Parts, Time of Application), where Failure Rate is the frequency of failure events during the cost calculation period. The function can be designed according to the desired cost to be optimized given the aforementioned parameters, and is not particularly limited to any specific cost function.

FIGS. 6(c) and 6(d) illustrate an example trade-off between recall and false alarm rate and the cost-aware model selection process, in accordance with an example implementation. Specifically, FIG. 6(c) illustrates an example of the costs derived for each of the different models (solution #1 to solution #6), as opposed to no solution at all. In the example of FIG. 6(c), the solutions are sorted from least number of false alarms (e.g., no solution), to highest recall rate. As illustrated in FIG. 6(c), the total cost can be determined from a function based on the actual cost of failure, and the cost of a false alarm. The model that minimizes the cost based on the function is then selected to be applied to the received data. In this example, solution #4 is selected as the model, due to the minimizing the costs based on the data feedback. FIG. 6(d) illustrates the example cost calculations for the cost aware model selection, which can include the model number, the recall percentage, the false alarm rate, the cost of failure, the predicted savings, the cost of a false alarm, the total savings value wise, and the total savings as a percentage. As illustrated in FIG. 6(d), solution #4 maximizes the total savings value wise, and is thus selected for the model to be applied for the given time period.

Figure 7:
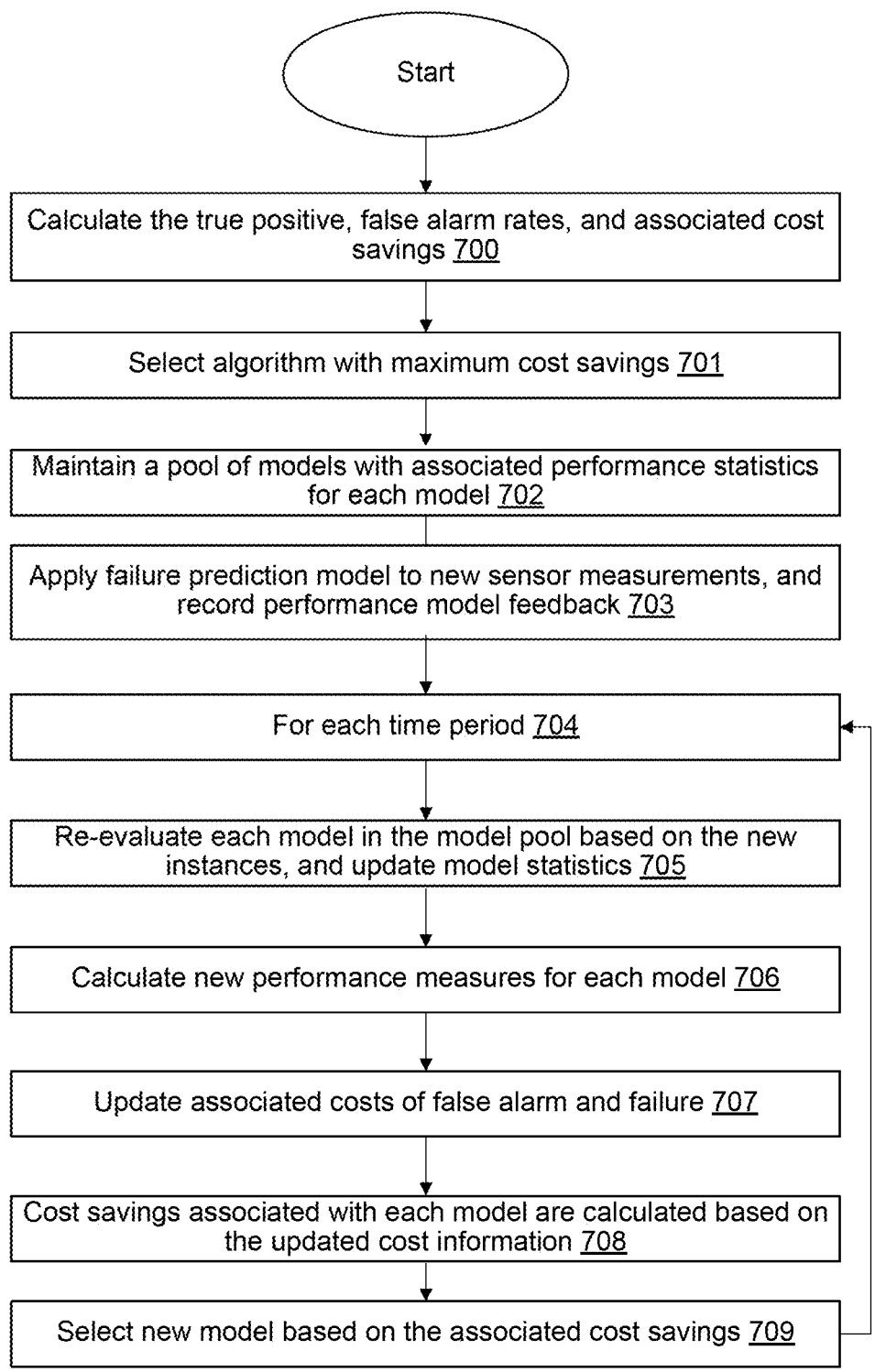
FIG. 7 illustrates an example flow diagram for selecting the parameters of the model, in accordance with an example implementation.

FIG. 7 illustrates an example flow diagram for selecting the parameters of the model, in accordance with an example implementation. Specifically, FIG. 7 is a flow executed by failure prediction model building and application 106. To control the trade-off, example implementations utilize an algorithm to choose the parameters of the model such that the overall cost savings achieved by failure prediction during deployment is maximized. The algorithm proceeds as follows.

At 700, for each candidate model (based on a choice of parameter values), the algorithm calculates the true positive (recall) and false alarm rates and the associated cost savings. At 701, the algorithm then selects the model which achieves the maximum cost savings.

At 702, the algorithm maintains a pool of models along with the associated performance statistics associated with each model. Such models are illustrated, for example, in FIG. 6(d). At 703, the chosen failure prediction model is applied to new sensor measurements and events, and the feedback from the maintenance team on the performance of the model is recorded.

At 704, a process is executed on a periodic basis (e.g., daily). At 705, each model in the model pool is re-evaluated based on the new instances, and the statistics of these models are updated from FIG. 6(d). At 706, the new performance measures are calculated for each model from utilizing the confusion matrix as illustrated in FIG. 6(b). As illustrated in FIG. 6(d), each model is executed based on the historical data feedback to determine what the recall rate and false alarm rate would have been for the historical data as described in FIG. 6(d) based on the confusion matrix as illustrated in FIG. 6(b). At 707, the associated costs of false alarm and failure costs are updated based on the expected costs of a false alarm and failure cost as provided by the administrator or as extracted from the historical data. For example, if a false alarm is determined to cost $X, then based on the false alarm rate for each model, the false alarm costs are calculated. At 708, based on the updated cost information, the cost savings associated with each model is calculated. That is, based on the outcome of the recall rate for each model, the expected costs of failure are determined to derive prediction savings, and based on the false alarm rate for each model, the false alarm costs are subtracted from the prediction savings to yield the total savings. At 709, a new model is selected based on the associated cost savings. The model is then retained until the time period expires, whereupon the flow proceeds back to 704 to re-execute the process for the next time period.

In example implementations, the flow for FIG. 7 can be applied to select models for each designated subset of apparatuses instead of all of the managed apparatuses. Such subsets can be defined by the user, or set according to the desired implementation. For example, certain specified units can be grouped together as a subset when there is a particular need to apply a unique model to those specified units. Subsets can also be defined based on the model of the apparatus, the location of the apparatuses, and so on. If for example, the costs would differ for apparatuses located at one location versus another location, or for one type of apparatus versus another type of apparatus, or for any other desired subset, then the models can be selected and applied for such defined subsets according to the desired implementation.

Figure 8:
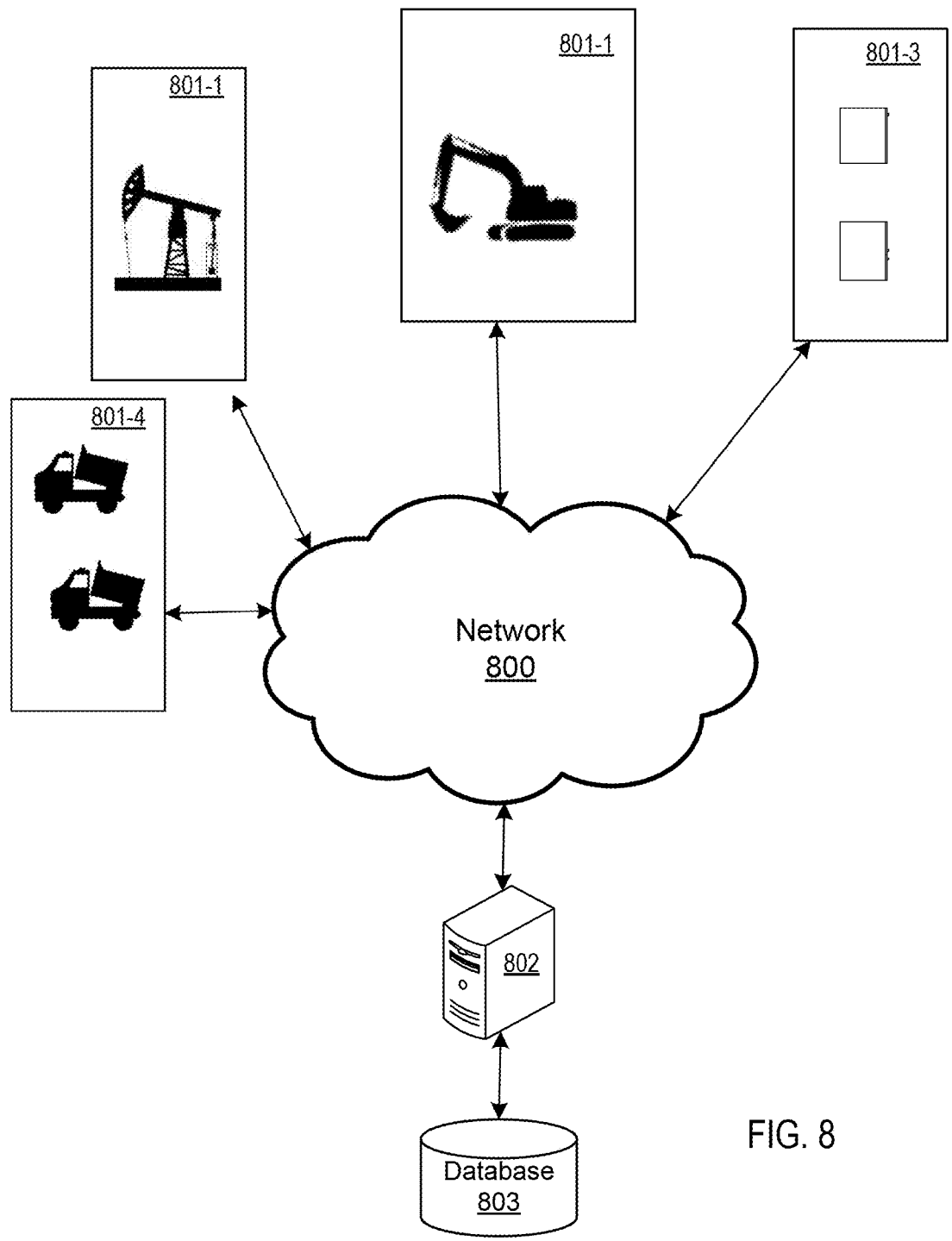
FIG. 8 illustrates an example system upon which example implementations may be applied.

FIG. 8 illustrates a system involving a plurality of apparatuses and a management apparatus, in accordance with an example implementation. One or more apparatuses or apparatus systems 801-1, 801-2, 801-3, and 801-4 are communicatively coupled to a network 800 which is connected to a management apparatus 802. The management apparatus 802 manages a database 803, which contains data feedback aggregated from the apparatuses and apparatus systems in the network 800. In alternate example implementations, the data feedback from the apparatuses and apparatus systems 801-1, 801-2, 801-3, and 801-4 can be aggregated to a central repository or central database such as proprietary databases that aggregate data from equipment or equipment systems such as enterprise resource planning systems, and the management apparatus 802 can access or retrieve the data from the central repository or central database. Such apparatuses can include stationary apparatuses such as coolers, air conditioners, servers, as well as mobile apparatuses such as automobiles, trucks, cranes, as well as any other apparatuses that undergo periodic maintenance.

Figure 9:
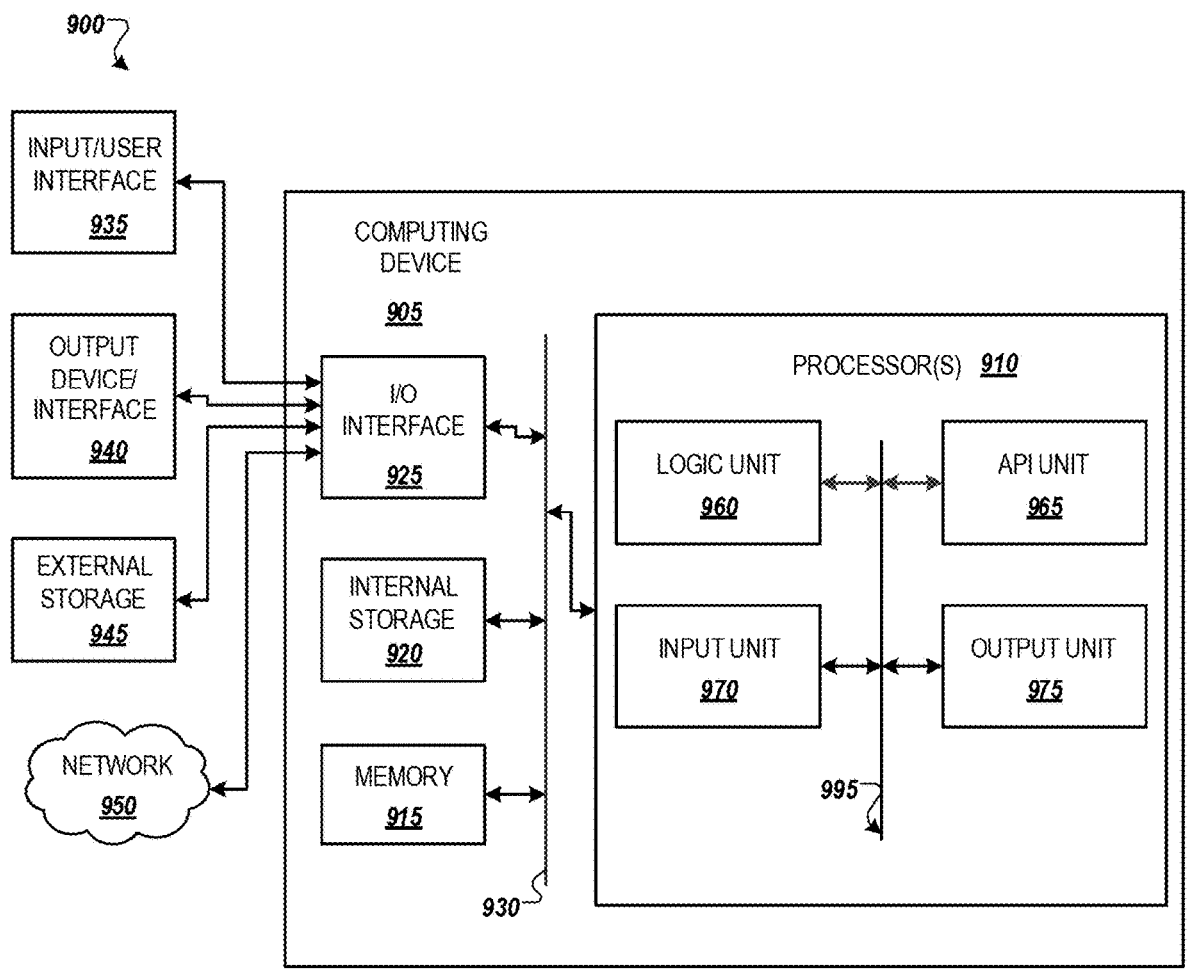
FIG. 9 illustrates an example computing environment with an example computer device suitable for use in some example implementations.

FIG. 9 illustrates an example computing environment with an example computer device suitable for use in some example implementations, such as a management apparatus 802 as illustrated in FIG. 8.

Computer device 905 in computing environment 900 can include one or more processing units, cores, or processors 910, memory 915 (e.g., RAM, ROM, and/or the like), internal storage 920 (e.g., magnetic, optical, solid state storage, and/or organic), and/or I/O interface 925, any of which can be coupled on a communication mechanism or bus 930 for communicating information or embedded in the computer device 905. I/O interface 925 is also configured to receive images from cameras or provide images to projectors or displays, depending on the desired implementation.

Computer device 905 can be communicatively coupled to input/user interface 935 and output device/interface 940. Either one or both of input/user interface 935 and output device/interface 940 can be a wired or wireless interface and can be detachable. Input/user interface 935 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 940 may include a display, television, monitor, printer, speaker, braille, or the like. In some example implementations, input/user interface 935 and output device/interface 940 can be embedded with or physically coupled to the computer device 905. In other example implementations, other computer devices may function as or provide the functions of input/user interface 935 and output device/interface 940 for a computer device 905.

Examples of computer device 905 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 905 can be communicatively coupled (e.g., via I/O interface 925) to external storage 945 and network 950 for communicating with any number of networked components, devices, and systems, including one or more computer devices of the same or different configuration. Computer device 905 or any connected computer device can be functioning as, providing services of, or referred to as a server, client, thin server, general machine, special-purpose machine, or another label.

I/O interface 925 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 900. Network 950 can be any network or combination of networks (e.g., the Internet, local area network, wide area network, a telephonic network, a cellular network, satellite network, and the like).

Computer device 905 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 905 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 910 can execute under any operating system (OS) (not shown), in a native or virtual environment. One or more applications can be deployed that include logic unit 960, application programming interface (API) unit 965, input unit 970, output unit 975, and inter-unit communication mechanism 995 for the different units to communicate with each other, with the OS, and with other applications (not shown). The described units and elements can be varied in design, function, configuration, or implementation and are not limited to the descriptions provided.

In some example implementations, when information or an execution instruction is received by API unit 965, it may be communicated to one or more other units (e.g., logic unit 960, input unit 970, output unit 975). In some instances, logic unit 960 may be configured to control the information flow among the units and direct the services provided by API unit 965, input unit 970, output unit 975, in some example implementations described above. For example, the flow of one or more processes or implementations may be controlled by logic unit 960 alone or in conjunction with API unit 965. The input unit 970 may be configured to obtain input for the calculations described in the example implementations, and the output unit 975 may be configured to provide output based on the calculations described in example implementations.

In an example implementation involving a management system configured to manage a plurality of apparatuses, each of the plurality of apparatuses configured to provide data feedback to the system, memory 915 can be configured to store a plurality of models configured to predict failure of one or more of the plurality of apparatuses from the data feedback, as illustrated, for example, in FIGS. 6(*c*) and 6(*d*).

Processor(s) 910 can be configured to apply a first model of the plurality of models to the plurality of apparatuses for a first period of time; and for a second period of time: based on the data feedback received for the first period of time, evaluate the plurality of models based on a cost function associated with a false alarm rate, recall rate, and a cost associated with failure of the plurality of apparatuses; select a second model from the plurality of models from the evaluation based on the cost function, and apply the second model to the plurality of apparatuses for the second period of time through the execution of the processes as illustrated in the flow diagram of FIG. 7.

Processor(s) 910 can also be configured to generate the plurality of models through identification of a first time window before each instance of failure in historical data feedback from the plurality of apparatuses, each of the first time window before each instance of failure indicative of a time window in which an alert is to be issued to prevent the instance of failure; for each of the identified first time window, identification of a second time window for each instance of failure based on the each of the identified first time window, the historical data feedback within the second time window for each instance of failure comprising a pre-failure pattern of data; extraction, from the historical data feedback from each of the identified second time window for the each of instance of failure, of a plurality of features; and provision of the plurality of features to a classifier to generate the plurality of models, through execution of the processes as described in FIGS. 5(*a*) and 5(*b*).

Processor(s) 910 can also be configured to apply the first model of the plurality of models to the plurality of apparatuses for the first period of time through a selection of the first model based on a determination of cost savings from an evaluation on historical data the cost function and the cost associated with failure for each of the plurality of models, as illustrated and described in FIGS. 6(*a*) to 6(*d*), such as the utilization of the false alarm rate for determination of cost savings in terms of a function of a cost of failure and the cost of a false alarm. The cost associated with failure of the plurality of apparatuses is determined from a function configured to determine the cost associated with failure of the plurality of apparatuses based on failure rate, cost of repair, and cost of downtime as illustrated in FIGS. 6(*c*) and 6(*d*). Processor(s) 910 can further be configured to, for each subsequent period of time from the first period of time, update the cost of repair and the cost of downtime; and determine the cost associated of failure for the each subsequent period of time as illustrated in FIG. 7.

Processor(s) 910 can also be configured to generate the plurality of models through: for the each of the identified second time window (e.g., such as the evidence window), identification of a third window (e.g., such as before evidence windows) for each instance of failure based on the each of the identified second time window, the historical data feedback within the third time window for each instance of failure comprising a transition period between a normal operation and the second window; determine normal samples from the historical data feedback based on discarding the first time window and the third time window for the each of the identified second time window; and downsample the normal samples for provision to the classifier, wherein the classifier is configured to generate the plurality of models from features extracted from the downsampled normal samples and the each of the identified second window as described, for example, in FIG. 5(*a*).

Processor(s) 910 can also be configured to apply the first model of the plurality of models to the plurality of apparatuses for a first period of time through an application of one or more first models for each subset of apparatuses from the plurality of apparatuses. Processor(s) 910 can be configured to select the second model from the plurality of models from the evaluation based on the cost function through a selection of one or more second models for the each subset of apparatuses from the plurality of apparatuses, wherein the evaluation based on the cost function is an evaluation for the each subset of apparatuses from the plurality of apparatuses; Processor(s) 910 can be configured to apply the second model to the plurality of apparatuses for the second period of time through an application of the one or more second models for the each subset of apparatuses from the plurality of apparatuses. Further, each subset can be based on at least one of differing models and differing locations of the plurality of apparatuses.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A system configured to manage a plurality of apparatuses, each of the plurality of apparatuses configured to provide data feedback to the system, the system comprising:
 a memory configured to store a plurality of models configured to predict failure of one or more of the plurality of apparatuses from the data feedback; and
 a processor, configured to:
  apply a first model of the plurality of models to the plurality of apparatuses for a first period of time;
  for a second period of time:
   based on the data feedback received for the first period of time, evaluate the plurality of models based on a cost function associated with a false alarm rate, a recall rate, and a cost associated with a failure of the plurality of apparatuses;
  select a second model from the plurality of models from the evaluation based on the cost function, and
  apply the second model to the plurality of apparatuses for the second period of time.

2. The system of claim 1, wherein the processor is configured to generate the plurality of models through:
 identification of a first time window before each instance of failure in historical data feedback from the plurality of apparatuses, each of the first time window before each instance of failure indicative of a time window in which an alert is to be issued to prevent the instance of failure;
 for each of the identified first time window, identification of a second time window for each instance of failure based on the each of the identified first time window, the historical data feedback within the second time window for each instance of failure comprising a pre-failure pattern of data;
 extract, from the historical data feedback from each of the identified second time window for the each of instance of failure, a plurality of features; and
 provide the plurality of features to a classifier to generate the plurality of models.

3. The system of claim 2, wherein the plurality of features comprises at least one of: window-level statistics, sensor data trends, and sensor data correlations; wherein the generation of the plurality of models are based on at least one of window extraction parameters and model building and application parameters;
 wherein the processor is configured to generate the plurality of models through:
 for the each of the identified second time window, identification of a third window for each instance of failure based on the each of the identified second time window, the historical data feedback within the third time window for each instance of failure comprising a transition period between a normal operation and the second window;
 determine normal samples from the historical data feedback based on discarding the first time window and the third time window for the each of the identified second time window; and
 downsample the normal samples for provision to the classifier, wherein the classifier is configured to generate the plurality of models from features extracted from the downsampled normal samples and the each of the identified second window.

4. The system of claim 1, wherein the processor is configured to apply the first model of the plurality of models to the plurality of apparatuses for the first period of time through a selection of the first model based on a determination of cost savings from an evaluation on historical data the cost function and the cost associated with failure for each of the plurality of models.

5. The system of claim 1, wherein the cost associated with failure of the plurality of apparatuses is determined from a function configured to determine the cost associated with failure of the plurality of apparatuses based on a failure rate, a cost of repair, and a cost of downtime.

6. The system of claim 5 wherein the processor is configured to:
 for each subsequent period of time from the first period of time, update the cost of repair and the cost of downtime; and
 re-evaluate the plurality of models based on the cost function associated with the false alarm rate, the recall rate, and the cost associated with a failure of the plurality of apparatuses, for the each subsequent period of time.

7. The system of claim 1, wherein the processor is configured to apply the first model of the plurality of models to the plurality of apparatuses for a first period of time through an application of one or more first models for each subset of apparatuses from the plurality of apparatuses;
 wherein the processor is configured to select the second model from the plurality of models from the evaluation based on the cost function through a selection of one or more second models for the each subset of apparatuses from the plurality of apparatuses, wherein the evaluation based on the cost function is an evaluation for the each subset of apparatuses from the plurality of apparatuses;
 wherein the processor is configured to apply the second model to the plurality of apparatuses for the second period of time through an application of the one or more second models for the each subset of apparatuses from the plurality of apparatuses;

wherein the each subset is based on at least one of differing models and differing locations of the plurality of apparatuses.

8. A method for managing a plurality of apparatuses, each of the plurality of apparatuses configured to provide data feedback to the system, the method comprising:
managing a plurality of models configured to predict failure of one or more of the plurality of apparatuses from the data feedback;
applying a first model of the plurality of models to the plurality of apparatuses for a first period of time;
for a second period of time:
based on the data feedback received for the first period of time, evaluating the plurality of models based on a cost function associated with a false alarm rate, a recall rate, and a cost associated with a failure of the plurality of apparatuses;
selecting a second model from the plurality of models from the evaluation based on the cost function, and applying the second model to the plurality of apparatuses for the second period of time.

9. The method of claim 8, further comprising generating the plurality of models, the generating the plurality of models comprising:
identifying a first time window before each instance of failure in historical data feedback from the plurality of apparatuses, each of the first time window before each instance of failure indicative of a time window in which an alert is to be issued to prevent the instance of failure;
for each of the identified first time window, identifying a second time window for each instance of failure based on the each of the identified first time window, the historical data feedback within the second time window for each instance of failure comprising a pre-failure pattern of data;
extracting, from the historical data feedback from each of the identified second time window for the each of instance of failure, a plurality of features; and
providing the plurality of features to a classifier to generate the plurality of models.

10. The method of claim 9, wherein the plurality of features comprises at least one of: window-level statistics, sensor data trends, and sensor data correlations; wherein the generation of the plurality of models are based on at least one of window extraction parameters and model building and application parameters;
wherein the generating the plurality of models comprises:
for the each of the identified second time window, identifying of a third window for each instance of failure based on the each of the identified second time window, the historical data feedback within the third time window for each instance of failure comprising a transition period between a normal operation and the second window;
determining normal samples from the historical data feedback based on discarding the first time window and the third time window for the each of the identified second time window; and
downsampling the normal samples for provision to the classifier, wherein the classifier is configured to generate the plurality of models from features extracted from the downsampled normal samples and the each of the identified second window.

11. The method of claim 8, wherein the applying the first model of the plurality of models to the plurality of apparatuses for the first period of time comprises selecting the first model based on a determination of cost savings from an evaluation on historical data the cost function and the cost associated with failure for each of the plurality of models.

12. The method of claim 8, wherein the cost associated with failure of the plurality of apparatuses is determined from a function configured to determine the cost of failure based on a failure rate, a cost of repair, and a cost of downtime.

13. The method of claim 12, further comprising:
for each subsequent period of time from the first period of time, updating the cost of repair and the cost of downtime; and
re-evaluate the plurality of models based on the cost function associated with the false alarm rate, the recall rate, and the cost associated with a failure of the plurality of apparatuses for the each subsequent period of time.

14. The method of claim 8, wherein the applying the first model of the plurality of models to the plurality of apparatuses for a first period of time comprises applying one or more first models for each subset of apparatuses from the plurality of apparatuses;
wherein the selecting the second model from the plurality of models from the evaluation based on the cost function comprises selecting one or more second models for the each subset of apparatuses from the plurality of apparatuses, wherein the evaluation based on the cost function is an evaluation for the each subset of apparatuses from the plurality of apparatuses;
wherein the applying the second model to the plurality of apparatuses for the second period of time comprises applying the one or more second models for the each subset of apparatuses from the plurality of apparatuses;
wherein the each subset is based on at least one of differing models and differing locations of the plurality of apparatuses.

15. A non-transitory computer readable medium, storing instructions for managing a plurality of apparatuses, each of the plurality of apparatuses configured to provide data feedback to the system, the instructions comprising:
managing a plurality of models configured to predict failure of one or more of the plurality of apparatuses from the data feedback;
applying a first model of the plurality of models to the plurality of apparatuses for a first period of time;
for a second period of time:
based on the data feedback received for the first period of time, evaluating the plurality of models based on a cost function associated with a false alarm rate, a recall rate, and a cost associated with a failure of the plurality of apparatuses;
selecting a second model from the plurality of models from the evaluation based on the cost function, and applying the second model to the plurality of apparatuses for the second period of time.

* * * * *